United States Patent [19]
Baccaro et al.

[11] 4,097,267
[45] Jun. 27, 1978

[54] PURIFICATION AND REALLOYING OF ARSENIC/SELENIUM ALLOYS

[75] Inventors: Gary P. Baccaro, Fairport; James F. Seitz, Rochester, both of N.Y.

[73] Assignee: Xerox Corporation, Stamford, Conn.

[21] Appl. No.: 812,869

[22] Filed: Jul. 5, 1977

[51] Int. Cl.² .................................................. B22D 23/08
[52] U.S. Cl. .............................. 75/0.5 B; 75/0.5 C; 75/134 P; 75/134 H; 264/13; 423/510; 423/561 R
[58] Field of Search ............... 75/0.5 B, 0.5 C, 134 H, 75/134 P; 264/11, 12, 13, 14; 423/510, 561 R

[56] References Cited
U.S. PATENT DOCUMENTS

| | | |
|---|---|---|
| 2,409,835 | 10/1946 | Clark et al. ........................... 423/510 |
| 2,930,678 | 3/1960 | Oberbacher et al. ................ 423/510 |
| 2,979,382 | 4/1961 | Frerichs ............................ 423/561 R |

FOREIGN PATENT DOCUMENTS 664,030  1/1952  United Kingdom.

*Primary Examiner*—W. Stallard

[57] ABSTRACT

Disclosed is a method for the reclamation of arsenic containing selenium scrap which comprises separating the scrap from various contaminants therein by fractional distillation to provide selenium of high purity. The recovered selenium is realloyed by contacting it with a master arsenic/selenium alloy containing 10 to 20% arsenic which master alloy has been prepared by the vapor/liquid combination of arsenic and selenium.

8 Claims, 2 Drawing Figures

PURIFICATION AND REALLOYING OF ARSENIC/SELENIUM ALLOYS

BACKGROUND OF THE INVENTION

This invention relates to the reclamation of arsenic/selenium alloys and more particularly to the reclamation and realloying of such alloys which are useful in electrostatographic copying. This form of document copying, originally disclosed by C. F. Carlson in U.S. Pat. No. 2,297,691, involves as an initial step the uniform charging of a plate or drum comprised of a conductive substrate normally bearing on its surface a non-conducting blocking layer which is covered by a layer of photoconductive insulating material. Typically, the conductive substrate is comprised of aluminum having a thin layer of non-conductive aluminum oxide on its surface. After charging, the device is exposed to activating radiation in an imagewise configuration which results in dissipation of the electrostatic charge in the exposed areas while the non-exposed areas retain the charge in a pattern known as the latent image. The latent image is developed by contacting it with a particulate, electroscopic marking material known as toner. This material, which normally comprises particles of a thermoplastic resin containing a colorant such as carbon black, is electrostatically attracted to the latent image which is, by definition, in the configuration of the portions of the photosensitive device which were not exposed to the activating radiation. The toner image may be subsequently transferred to paper and fused into it to form a permanent copy. Following this, the latent image is erased by discharging the photosensitive device and excess toner is cleaned from it to prepare the device for the next cycle.

The photoconductive insulating material is characterized in that it has a high electrical resistance in the dark which resistance decreases significantly upon exposure to activating radiation. Amorphous selenium was found to be an efficient inorganic photoconductor and has been widely used in certain plain paper copiers. More recently, arsenic/selenium alloys have come into their own as commercially acceptable inorganic photoconductors. Arsenic alloys of selenium are preferable to pure selenium for several reasons. First of all, the photodischarge speed of such alloys is faster than that of unalloyed selenium. In addition, these alloys are photoresponsive to longer wavelengths of light than is pure selenium and therefore can be used to copy a wide spectrum of material. Furthermore, arsenic/selenium alloys are generally harder than pure selenium and are therefore more resistant to physical abrasion. In spite of their increased resistance to physical abrasion, photosensitive devices employing arsenic/selenium as the photoconductor do tend to wear out and must be replaced.

It is apparent that sound economics dictate the recovery and reuse of the arsenic/selenium alloy remaining on the discarded photosensitive devices. Such reclamation involves removing the alloy from its substrate and purifying it to a state of purity suitable for reuse as a photoconductive alloy. Several methods have been used to remove the alloy from the substrate. These methods include thermal shock treatments, hydraulic lathing and mechanical shaving. These methods are all useful for removing the alloy from its substrate but generally provide a recovered alloy containing impurities such as toner residue or aluminum as in the case where the alloy is removed from the drum by mechanical shaving.

The patent literature contains reference to the purification of selenium by fractional distillation, cf. Oberbacher, U.S. Pat. No. 2,930,678; Clark, U.S. Pat. No. 2,409,835 and Frerichs, U.S. Pat. No. 2,979,382. The fractional distillation followed by re-shotting of the distillate is disclosed in British Pat. No. 664,030 and Henriksson discloses in U.S. Pat. No. 3,785,806 a method for realloying selenium with arsenic using a master alloy formed by the solid/solid combination of arsenic and selenium.

The prior art does not disclose a process for the continuous fractional distillation of arsenic/selenium alloys combined with realloying the distilled selenium to form a purified arsenic/selenium alloy suitable for use in electrostatographic copying. It is an object of this invention to provide such a process.

SUMMARY OF THE INVENTION

The present invention is a process for the reclamation of arsenic containing selenium scrap. The process comprises:

(a) feeding the scrap into a premelter and heating it to a temperature sufficiently high to cause its liquefaction;

(b) feeding the melted scrap into a fractional distillation column to thereby repeatedly vaporize and condense the arsenic/selenium;

(c) removing low boiling impurities from the scrap in the fractional distillation column and recovering substantially pure liquid selenium from the column;

(d) providing a liquid arsenic/selenium master alloy containing from about 10 to 20% on a weight basis arsenic, said alloy having been prepared by the vapor/liquid combination of arsenic and selenium in the proper proportions;

(e) combining the liquid arsenic/selenium master alloy with the liquid selenium obtained from the fractional distillation column to form a new arsenic/selenium alloy containing the desired amount of arsenic;

(f) shotting the new arsenic/selenium alloy into a non-reactive liquid to form discrete solid particles of said alloy.

DETAILED DESCRIPTION AND PREFERRED EMBODIMENTS

Figure 1:
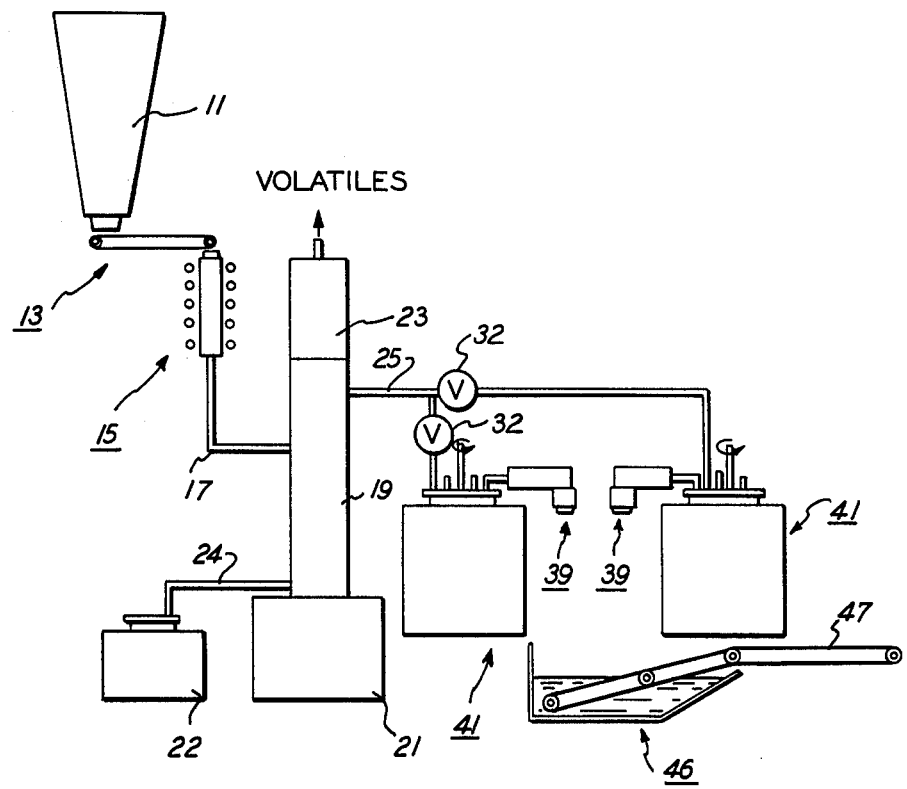
FIG. 1 is a flow diagram of the apparatus used to carry out the process of the instant invention.

Referring to FIG. 1, the process of the present invention is carried out as follows:

Arsenic/selenium scrap is fed from scrap bin 11 be gravimetric feeder 13 to induction premelter 15. In the premelter, the alloy is liquified by bringing it to a temperature of approximately 450° C. The liquid alloy leaves the premelter via vessel 17 and enters the distillation column 19 at a temperature of greater than 450° C. It should at least be a free flowing liquid and can be heated to above its boiling point and introduced as a gas.

The distillation column is designed to vaporize the liquid mixture of arsenic, selenium and impurities and to recover selenium in a nearly pure state. The column can consist of a series of sieve plates designed to achieve equilibrium by intimate contact of the falling liquid stream with the rising vapor stream. A certain degree of separation is thereby obtained at each plate or stage. The distillation can also be performed in packed columns. Whereas in plate columns each stage is an equilibrium stage, in packed columns the vapor and liquid streams never reach equilibrium and point-to-point relationships of the contacting phases are exceedingly important. A column packed with Rashig rings is generally preferred because of ease of construction and greater range of operating throughputs. The column also incorporates a reboiler 21 and a condenser 23. A high arsenic collector 22 is connected to the reboiler 21 by line 24. The purpose of the high arsenic collector is to remove excess arsenic so that substantial amounts of $As_2Se_3$ will not form. In order to achieve the desired distillation, the concentration of arsenic in the reboiler and column is kept below 25 weight percent. Volatile constituents, consisting of selenium, oxides of arsenic ($As_2O_3$), chlorides, $AsCl_3$, $SeCl_x$, metallic chlorides, e.g., $FeCl_3$, and hydrocarbons move upward in the column, whereas heavier materials, consisting primarily of arsenic (as arsenic triselenide) and metallic impurities, move to the bottom of the column.

Selenium is condensed in the condenser at approximately 680° C. At this temperature the other volatiles are not condensed and are withdrawn as overhead impurities. Pure selenium is partially withdrawn from the top of the column through line 25 with the remainder recycled into the column as reflux. Metallic impurities collect in the reboiler and a high arsenic-selenium waste stream is withdrawn from the bottom plate or the reboiler. Withdrawal can be either on a continuous or periodic basis. The distillation column is normally quartz lined although an alumina or Mullite surface may be used.

Figure 2:
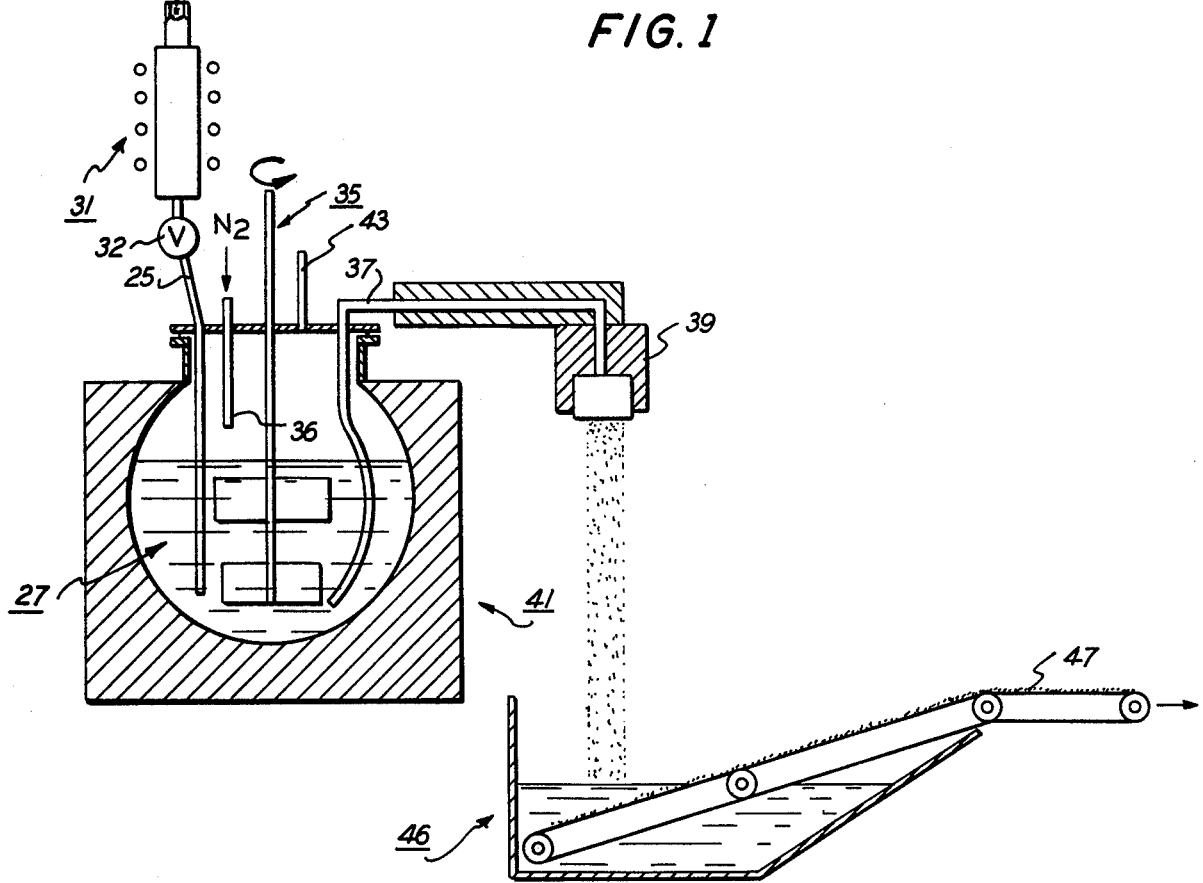
FIG. 2 represents a schematic of the realloying and shotting apparatus.

The selenium condensate (99.999% purity) is collected in two pyrex reactors 41 maintained at 300° C. In operation, the reactors will alternately collect the condensate. Upon completion of one charge of purified selenium, the selenium is realloyed by introducing an arsenic/selenium master alloy (a high arsenic/selenium alloy) and alternatively, chlorine gas. The realloying apparatus is illustrated by FIG. 2. The master alloy which contains from 10 to 20 weight percent arsenic is conveyed from a feed hopper (not shown) to the induction premelter 31. The molten alloy flows to the pyrex reaction vessel 27 through line 25 with the rate of flow being controlled by valve 32. The molten arsenic/selenium master alloy and the molten selenium from the distillation process are combined in the proportions necessary to form the final alloy desired with stirring being supplied by agitator 35. Alternatively nitrogen gas is sparged into the molten arsenic/selenium through inlet 36 to provide agitation. The nitrogen gas is also sparged into the vessel to blanket the molten material and prevent oxidation. Chlorine is introduced as a gas through a gas dispersion tube 43. This step is normally carried out at a temperature of about 300° C for a period of about 20 minutes depending on the final chlorine composition desired. Upon formation of the desired alloy, it is pumped through line 37 by pressurizing the vessel to the shotter 39. Heating mantles 41 are employed to maintain the alloy in the molten state during this operation. The shotter is designed to disperse the molten alloy into a fine dispersion which is dropped into shotting tank 46 which is filled with distilled, deionized water. The droplets solidify into discrete particles in the shotting tank and are transported for further processing by conveyor 47.

The method of practicing the invention is further illustrated by the following examples in which all parts and percentages are by weight unless otherwise specified.

EXAMPLE I

An amount of 22 kilograms of an arsenic-selenium master alloy containing 10% arsenic and 90% selenium is prepared as follows:

1. 2.2 kilograms of 99.99% arsenic (chunk form, nominally 6mm diagonal) and 19.8 kilograms of 99.99% selenium (pellets, nominally 3mm in diameter) are layerized in a 7 liter quartz flask. A nitrogen gas purge is initiated to the top of the flask to blanket the materials and prevent oxidation.

2. The vessel contents are heated by means of electric mantles to 600° C in a period of less than 1 hour. The exotherm resulting from the reaction between the arsenic and selenium cause the temperature to increase to about 680° to thereby sublime the arsenic. Agitation is initiated and the arsenic reacted with the selenium principally by means of sublimation and gas-liquid reaction with the molten selenium.

3. Agitation is continued for an additional 45 minutes with the temperature gradually ramped down to 520° C.

4. The molten material is then pressure transferred to a quartz sieve plate (containing nominally 0.07 cm. diameter holes) and maintained at approximately 500° C. The molten material forms spherical particles (shot) upon exiting the sieve plate which particles are dropped into deionized water wherein the shot solidifies into, nominally, 3mm diameter particles.

EXAMPLE II

The following example outlines the continuous distillation of 4841 pounds of selenium scrap and the on-line realloying of 28 discrete batches of alloy. The scrap is of a varied type with ranges of key impurities as follows:

Arsenic: ND — 0.4%
Chlorine: ND — 120 ppm
Iron: ND — 50 ppm
Copper: ND — 50 ppm
Carbon (as cpds): ND — 300 ppm
ND = not detected The schematic of the equipment used follows that of FIG. 1 with the following clarifications:

Premelter — inductively heated graphite crucible with overflow delivery.

Reboiler — 6 inch OD × 36 inch L quartz vessel heated by means of a tube furnace.

Column — 4 inch OD × 2 ft. L quartz tube packed with ½ inch quartz Rashing rings; heated by means of electric mantles.

Condenser — quartz open air (radiant) type.

Reactors — 22 liter borosilicate glass heated by electric mantles.

Valving — quartz plug valves.

The following control features were also incorporated:

Scrap feed — gravimetric belt feeder.

Reboiler liquid level — feedback control to gravimetric feeder with level monitored by gamma radiation absorption.

Distillation rate — feedback control from rate monitor to reboiler furnace power input. Rate monitor was of load cell type mounted under collection (reactor) vessels.

Reflux ratio — set at nominal value of one by design of condenser. Condenser is of a split design with a distillate collection plate mounted mid-way in the radiant cooling zone. The collection plate also includes a quartz plug valve to operate the distillation column in either total reflux or withdrawal mode.

Temperatures — temperatures were monitored via thermocouples with control via variable auto-transformers or analog SCR controllers.

PROCESSING

1. Start-up

The scrap feeder is started at a rate of one pound per minute and fed into the induction melter. Temperature of the molten scrap is maintained at 450° ± 50° C for the duration of the run with the reboiler being heated to 600° C. Scrap begins to enter the reboiler after approximately 90 minutes and the condenser reflux valve is placed in the total reflux position. The temperature of the reboiler is ramped slowly to the boiling point of selenium (685° C) and the power level adjusted in order to maintain refluxing selenium in the condenser.

2. Distillate collection

When the reboiler level reaches 100 pounds (approximately 2.5 hours after the scrap feeder is turned on), the condenser reflux valve is placed in the withdrawal mode with the distillate being collected in reactor No. 1. Total amount and rate are monitored via the load cells and a control set point of one pound per minute is chosen corresponding to the scrap feed input rate with the rates being readjusted to 0.65 pounds per minute later in the run. When the load cell indicates 170 pounds of distillate has been collected, the distillate is converted to reactor No. 2 by means of quartz plug valves. The contents of reactor No. 1 are realloyed as described in section 3 hereof as reactor No. 2 is being filled. When reactor No. 2 is filled with 170 pounds of distillate, the distillate is converted back to reactor No. 1 which by this time is emptied. The sequence of collection, diverting and realloying is continued for a total of 88 hours resulting in 28 batches of alloy; 10 of the batches from reactor No. 2 are left unalloyed for complete analysis of selenium purity. At the end of 88 hours of continuous distillation, all power is turned off and the reboiler and premelter emptied. Total loses, including reboiler and premelter residues are 7%; the reboiler residue contains 18% arsenic and several hundred ppm of metallic impurities (mainly Fe, Al, Cr, Cu, Mn, Ni, Pb, Ti and Zn).

3. Alloying

This section describes the alloying procedure for preparing a batch of alloy with a targeted composition of 0.36% arsenic and 100 ppm Cl.

(a) Arsenic addition

Agitation is begun within the first 20 pounds of selenium distillate collection by passing nitrogen gas through the melt at a rate of 500 cc/minute (STP). The melt temperature is maintained at 300° ± 3° C. In a separate quartz vessel, 6.6 pounds of 10% arsenic/-selenium (prepared as described in Example I) is heated to 450° C under a nitrogen atmosphere. Melt electrical conductivity behavior is determined by applying a 4V DC potential across the electrodes and monitoring the current. Chlorine residual levels in the selenium distillate are determined on-line by checking the conductivity. When 120 pounds of distillate is collected, the molten 10% arsenic-selenium master alloy (at 450° C) is added. The nitrogen agitation rate is increased to 860 cc/min. and maintained at this level. Distillate collection is stopped (i.e., diverted to the other reactor) when the total weight measured is 180 lbs. (6.6 lbs. master alloy and 173.4 lbs. selenium).

(b) Chlorine addition

Commencing 110 minutes after the 10% arsenic-selenium master batch addition, chlorine gas is passed through the dispersion tube at a rate of 204 cc/min. (STP) for 15 minutes. The addition time is based on the electrical conductivity calibration curves and previous knowledge of chlorine retention.

(c) Shotting

The shotting operation is initiated 31 minutes after the end of the chlorine addition. Shotting is accomplished by pressure transferring the molten alloy at 300° C to a quartz sieve plate (with nominally 0.07 cm diameter holes). The shot is quenched in distilled-deionized water. Total shotting time is approximately one hour.

(d) Post shotting

The shotted alloy is drained and forced air dried at 35° C for approximately one hour. The dried alloy is then packaged.

(e) Bulk analysis

Chemical analysis of the batch indicates a final composition of 0.37% arsenic and 100 ppm chlorine.

EXAMPLE III

Improved purity of the arsenic-selenium alloy prepared by the process of the instant invention as compared to that prepared by conventional methods can be demonstrated by comparing the optical emission spectrographic analysis of several batches taken from the preparation described in Example II (Table I) with typical material supplied from a high purity vendor (Table II). All analyses are conducted on the same spectrographic instrument by the same spectroscopist.

Table I

| Optical Emission Spectrographic Analysis of Selenium-Arsenic | | | | | | |
|---|---|---|---|---|---|---|
| | | | Element ppmw | | | |
| Sample | As | Si | Fe | Mg | Al | K | Ca |
| 1 | High | <1 | <1 | <1 | <1 | <3 | <1 |
| 2 | High | <1 | <1 | <1 | <1 | <3 | <1 |
| 3 | High | <1 | <1 | <1 | <1 | <3 | <1 |
| 4 | High | <1 | <1 | <1 | <1 | <3 | <1 |
| 5 | High | <1 | <1 | <1 | <1 | <3 | <1 |
| 6 | High | <1 | <1 | <1 | <1 | <3 | <1 |
| 7 | High | <1 | <1 | <1 | <1 | <3 | <1 |
| 8 | High | <1 | <1 | <1 | <1 | <3 | <1 |
| 9 | High | <1 | <1 | <1 | <1 | <3 | <1 |
| 10 | High | <1 | <1 | <1 | <1 | <3 | <1 |
| 11 | High | <1 | <1 | <1 | <1 | <3 | <1 |
| 12* | 3 | <1 | <1 | <1 | <1 | <3 | <1 |
| 13 | High | <1 | <1 | <1 | <1 | <3 | <1 |
| 14 | High | <1 | <1 | <1 | <1 | <3 | <1 |
| 15 | High | <1 | <1 | <1 | <1 | <3 | <1 |

*This analysis was made before addition of the master alloy.

Table II

| Optical Emission Spectrographic Analysis of Selenium Materials from High Purity Vendors | | | | | | |
|---|---|---|---|---|---|---|
| | | | Element ppmw | | | |
| Sample | As | Si | Fe | Mg | Al | K | Ca |
| 1 | High | 3 | 1 | <1 | <1 | <3 | <1 |
| 2* | <3 | 1 | 3 | <1 | <1 | <3 | <1 |
| 3 | High | 3 | 1 | <1 | <1 | — | <1 |
| 4 | High | 3 | <1 | <1 | <1 | — | 1 |
| 5 | High | 5 | <1 | <1 | <1 | — | 1 |
| 6 | High | <1 | <1 | <1 | <1 | — | <1 |

*High purity selenium

Besides purity enhancement by the distillation process, the alloying procedures disclosed herein are important in achieving the desired physicochemical properties that control evaporation fractionation during the photoreceptor vacuum coating operation. In the later process, it is well known that arsenic-selenium alloys typically fractionate during vapor coating operations. The degree of fractionation determines the photoelectric and aging properties of the photoreceptor. The degree of fractionation can be affected by the properties of the alloy under given coating conditions. The time/temperature procedures disclosed herein control this feature and further, can be determined, while alloying, by monitoring the electrical conductivity or resistivity. In Example II, alloys controlled to a higher resistivity produced higher fractionation behavior tendencies than alloys controlled to lower resistivities. Table III demonstrates this. The method of control is found by emperically correlating time/temperature histories with electrical conductivity or resistivity.

Table III

| Alloy | Resistivity $\times 10^{-3}$ a 300° C | Top Surface Arsenic* (wt. %) |
|---|---|---|
| A | 32 | 1.5 |
| B | 38 | 1.6 |
| C | 67 | 2.9 |
| D | 70 | 2.8 |

*X-ray microprobe at 0.3 $\mu$ penetration from top surface of photoreceptor.

What is claimed is:

1. A method for the reclamation of arsenic containing selenium scrap which comprises:
   (a) feeding the scrap to a premelter and heating it to a temperature sufficiently high to cause its liquefaction;
   (b) feeding the melted scrap into a fractional distillation column to thereby repeatedly vaporize and condense the arsenic/selenium;
   (c) removing low boiling impurities from the scrap in the fractional distillation column and recovering substantially pure liquid selenium from the column;
   (d) providing a liquid arsenic/selenium master alloy containing from about 10 to 20% arsenic, said alloy having been prepared by the vapor/liquid combination of arsenic and selenium in the proper proportions;
   (e) combining the liquid arsenic/selenium master alloy with the liquid selenium obtained from the fractional distillation column in the proportion required to form a new arsenic/selenium alloy containing the desired amount of arsenic;
   (f) shotting the new arsenic/selenium alloy into a non-reactive liquid medium to form discrete solid particles of said alloy.

2. The method of claim 1 wherein gaseous chlorine is sparged into the liquid arsenic/selenium alloy formed by the liquid/liquid combination of the arsenic/selenium master alloy and selenium before the shotting of said alloy.

3. The method of claim 1 wherein the fractional distillation column is packed with Rashig rings.

4. The method of claim 1 wherein the concentration of arsenic in the column is less than 25 weight percent.

5. The method of claim 1 wherein the distillation column is lined with quartz.

6. The method of claim 1 wherein the arsenic/selenium master alloy is prepared by combining solid arsenic and solid selenium and heating the so-formed combination to a temperature sufficient to sublime the arsenic and to melt the selenium.

7. The method of claim 1 wherein nitrogen gas is sparged into the reaction vessel during the step of combining the liquid arsenic/selenium master alloy with liquid selenium.

8. The method of claim 1 wherein the new arsenic/selenium alloy is shotted into water.

* * * * *